United States Patent [19]

Jabsen

[11] 4,217,173
[45] Aug. 12, 1980

[54] NUCLEAR REACTOR INSPECTION DEVICE

[75] Inventor: Felix S. Jabsen, Lynchburg, Va.

[73] Assignee: The Babcock & Wilcox Company, New Orleans, La.

[21] Appl. No.: 853,074

[22] Filed: Nov. 21, 1977

[51] Int. Cl.² ............................................. G21C 17/00
[52] U.S. Cl. .................................. 176/19 LD; 176/30
[58] Field of Search ............ 176/19 R, 30, 80, 19 LD

[56] References Cited

U.S. PATENT DOCUMENTS

| | | | |
|---|---|---|---|
| 3,072,554 | 1/1963 | Madsen | 176/31 |
| 3,813,286 | 5/1974 | Goldman et al. | 176/19 LD |
| 3,823,068 | 7/1974 | Worlton et al. | 176/80 |
| 3,846,235 | 1/1974 | Jones et al. | 176/19 LD |
| 3,863,770 | 2/1975 | Shallenberger et al. | 176/30 |
| 3,929,570 | 12/1975 | Jones et al. | 176/80 |
| 3,969,187 | 7/1976 | Worlton et al. | 176/19 LD |
| 3,975,949 | 8/1974 | Johnson et al. | 176/80 |
| 4,036,686 | 7/1977 | Weilbacher et al. | 176/19 R |
| 4,053,356 | 10/1977 | Brammer, Jr. | 176/30 |

Primary Examiner—Stephen C. Bentley
Assistant Examiner—S. A. Cangialosi
Attorney, Agent, or Firm—J. P. Sinnott; Robert J. Edwards; D. Anthony Gregory

[57] ABSTRACT

A typical embodiment of the invention combines a novel cellular end fitting for a nuclear reactor fuel assembly with a new design for a fuel rod end cap and a radiation sensing device probe to provide a means for swiftly and accurately distinguishing sound fuel rods from those rods that have developed leaks. For example, a somewhat thinner than usual fuel rod end cap is accessible through the open cellular structure of the end fitting to permit a hollow metal probe to contact the fuel rod end cap. This direct contact excludes most of the water, metal and other shielding materials from the volume between the interior of the fuel rod and the radiation detector, thereby improving the quality of the fuel rod examination. A bridge and trolley structure for accurately positioning the probe also is described.

2 Claims, 4 Drawing Figures

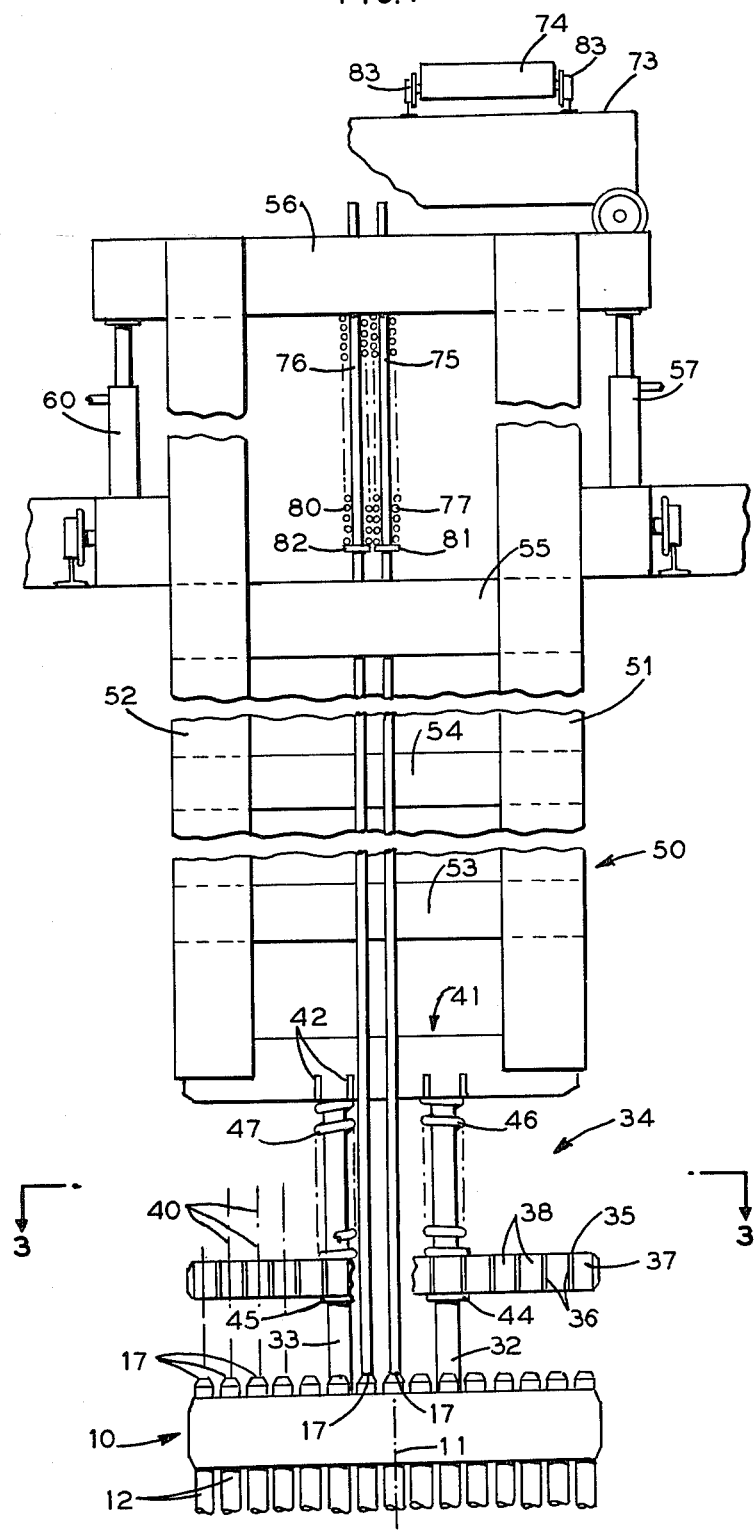

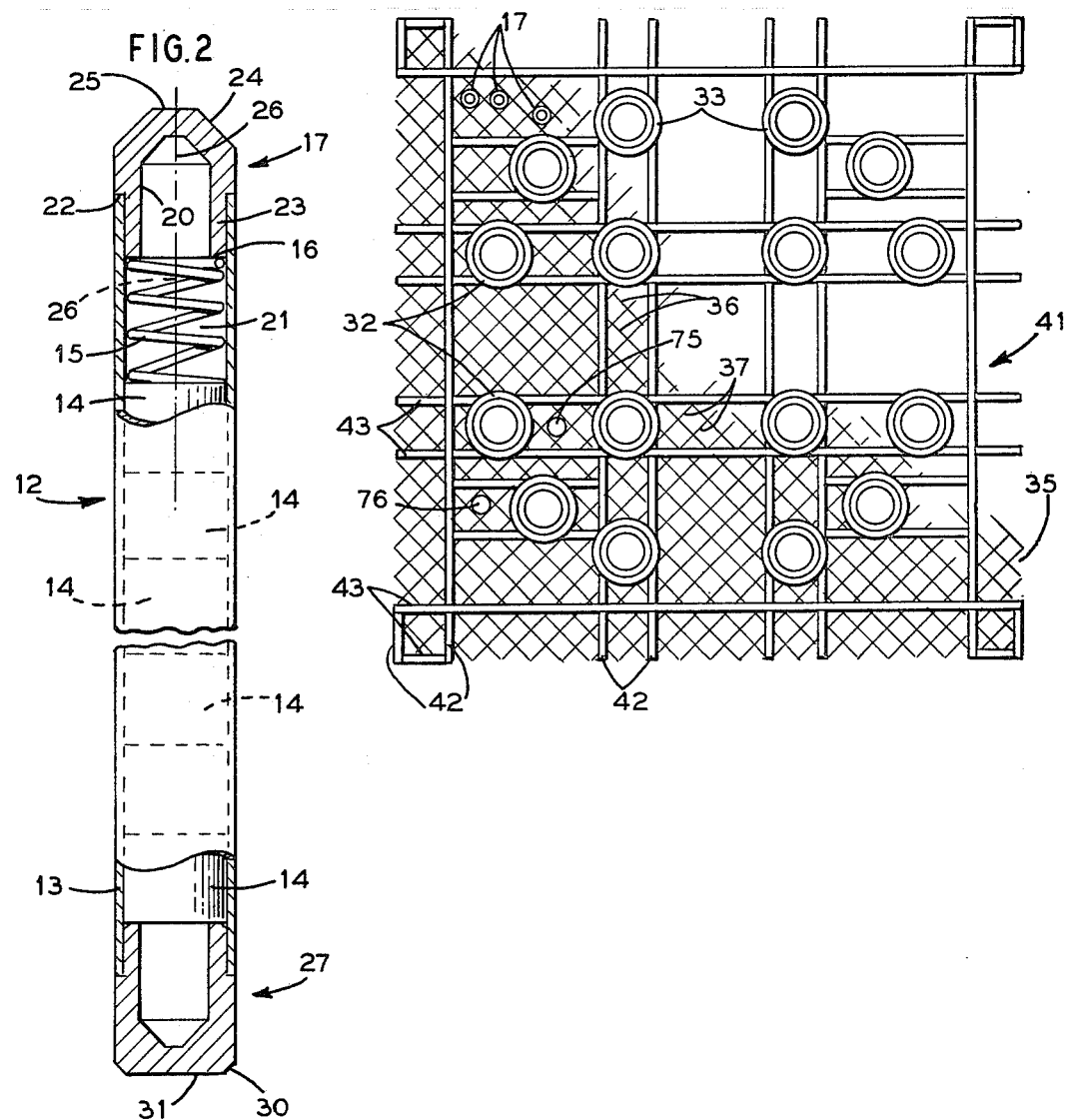

NUCLEAR REACTOR INSPECTION DEVICE

BACKGROUND OF THE INVENTION

1. Field of the Invention

This invention relates to fuel rod inspection techniques for nuclear reactors, and the like and, more particularly, to a combination of fuel rod end cap, cellular end fitting and radiation sensing device probe for fuel rod integrity inspection, and the like.

2. Description of the Prior Art

Ordinarily to extract useful power from a nuclear reactor it is necessary to assemble a suitable concentration of fissionable material in the reactor core. This fissionable material usually is prepared as an oxide of uranium or plutonium, the oxide being pressed into pellets that are loaded into long, hollow tubes. These tubes, when capped and sealed, are called fuel rods. As a general matter, to reduce production costs, and the like, it is customary to use solid metal plugs that are welded in place within the fuel rod tube.

To enhance the strength of the array of fuel rods that comprise the reactor core, it has been the practice to subdivide these fuel rods into individual structural groups. Each of these groups is composed of about two hundred fuel rods that are bound together to form a fuel assembly which can be inserted into or withdrawn from the reactor core.

The fuel rods in each of these fuel assemblies are bound together in a number of ways. Typically, an array of cellular grids are positioned at various stations along the length of the fuel rods in the assembly. The dimensions of the individual cells, moreover, enable the metal plates that comprise the grids to engage the adjacent surfaces of the rods and thereby stabilize and sustain these fuel rods in proper core position. The ends of the fuel rods often are received in end fittings to add further mechanical support. Frequently, heavy and expensive castings in rather unique shapes are used as end fittings. Not only are these castings costly, but they are also difficult to manufacture.

These prior art cast end fittings also impose a further and more serious difficulty. This latter difficulty arises from the fact that the fuel rods in the reactor core must cope with an extremely hostile environment. Temperature, pressure, vibration and radiation effects, for example, all are extreme in the typical reactor core, and all tax the structural integrity of each of the fuel rods. Naturally, routine inspections of the fuel rods are mandatory in order to identify those rods that have developed leaks or otherwise failed in service.

Usually these inspections are accomplished by withdrawing a fuel assembly from the reactor core and placing the fuel assembly in a container. A fluid is pumped through the container and the radiation level of the fluid that is discharged from the container is monitored. An unusually high level of radioactivity in the fluid that is discharging from the container is indicative of one or more leaking fuel rods in the assembly or, perhaps, "tramp" radioactive material that is being scoured from the rod surface by the fluid. In any event, if an unusually high level of radioactivity is observed, the fuel assembly then must be disassembled with the aid of remotely controlled manipulators. Subsequent to the foregoing disassembly, each of the fuel rods in the fuel assembly must be individually inspected to identify the leaking fuel rod or rods. The failed fuel rod or rods then are withdrawn for reprocessing or further treatment and the fuel assembly is reassembled, again with the use of remote, radiation shielded manipulators, with the partially used rods and additional new fuel rods, as the case may be.

This procedure is, of course, time consuming and expensive. Clearly, there is a major industrial need to develop improved techniques for inspecting nuclear reactor fuel rods.

SUMMARY OF THE INVENTION

These and other problems that have beset the prior art are overcome through the practice of the invention. Typically, the structural combination of a cellular end fitting for a fuel assembly in which the ends of the individual fuel rods are in registry with the respective cells cooperate with hollow fuel rod end caps to enable a hollow radiation probe to bear against one of the end caps and provide a means for measuring the radioactivity emanating from the fuel rod that is under observation and, hence, the structural integrity of that rod. The direct contact between the radiation probe and the hollow fuel rod end cap, moreover, eliminates the radiation shielding effects caused by the water and excess fuel rod, spider and end cap material that otherwise would be present between the fuel rod and the radiation detector. This shielding would, of course, tend to degrade the radiation signal from the interior of the fuel rod, thereby reducing the reliability of the fuel rod integrity inspection perhaps to a point of complete unreliability.

The cellular nature of the end fitting that characterizes one of the features of this invention also has the further advantage of reducing fuel element costs. In this respect, it will be recalled that heavy cast fuel element end fittings have been customary in the prior art. These castings not only were difficult to manufacture, but also required a great deal of quality assurance inspection thereby increasing overall production expense. In contrast, the end fitting of the present invention is built up from stamped metal plates that interlock with each other to provide a relatively inexpensive but satisfactorily strong structure.

Thus, there is provided in accordance with the invention an improved technique for inspecting the structural integrity of nuclear reactor fuel rods without imposing a need to laboriously dismantle the fuel assemblies in which these rods usually are mounted.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE PREFERRED EMBODIMENTS

FIG. 1 is a front elevation in partial section of a portion of a fuel assembly and inspection apparatus that embodies principal features of the invention;

FIG. 2 is a front elevation in full section of a typical fuel rod for use in connection with the embodiment of the invention that is shown in FIG. 1;

FIG. 3 is a plan view of an end fitting structure, taken along the line 3—3 of FIG. 1 and viewed in the direction of the arrows.

DETAILED DESCRIPTION OF THE PREFERRED EMBODIMENTS

Figure 4:
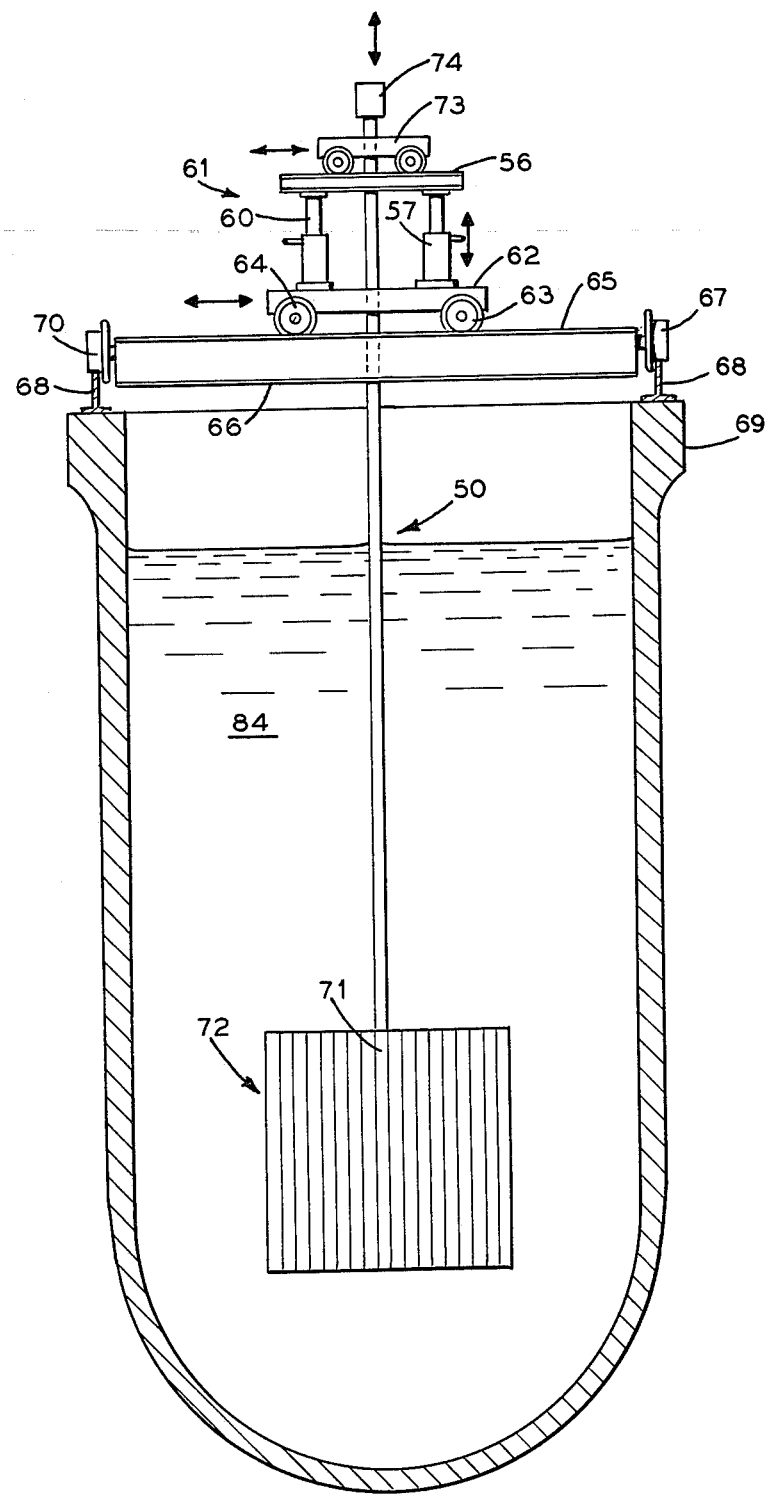
FIG. 4 is a front elevation in full section of a typical embodiment of the invention mounted on a nuclear reactor pressure vessel.

For a more complete appreciation of the invention, attention is invited to FIG. 1 which shows a fuel assembly 10. The fuel assembly 10 has a longitudinal axis 11. A group of about two hundred fuel rods 12 are arranged in general parallel longitudinal alignment with the axis 11, the transverse configuration of the fuel rods 12 being essentially a square array.

A typical fuel rod that embodies features of the invention is illustrated in FIG. 2. Thus, the fuel rod 12 has a thin, hollow tubular body 13 that enclosed a group of generally cylindrical fuel pellets 14. The fuel pellets 14 are lodged in place, with an adequate provision to accommodate the pellet expansion and swelling that usually occurs in use through a coil spring 15 that is received snugly within one of the ends of the tubular body 13. As illustrated, the coil spring 15 bears against an adjacent one of the pellets 14 and a transverse end 16 of a fuel rod end cap 17. Illustratively, and in accordance with one of the salient features of the invention, a recess 20 is formed within the cap 17 in order to reduce to a safe, practical minimum, the volume of material that is interposed between the fuel pellets 14 and any gases that might accumulate in the volume 21 that is defined by the recess 20 in the cap 17, the coil spring 15 and the portion of the body 13 of the fuel rod 12 that is adjacent to the spring 15.

The cap 17 hermetically seals the open end of the tube body 13, preferably being welded to the open end of the tube body at the junction between the transverse end of the body 13 and an annular flange 22 that protrudes in a radial direction beyond a cylindrical portion 23 of the cap 17. As shown in FIG. 2, the cylindrical portion 23 is snugly received within the tube body 13.

The portion of the cap 17 that is outside of the tubular body 13 terminates in a chamfered section 24 and a flat section 25 that is generally transverse to longitudinal axis 26 of the fuel rod 12. As shown in this illustrative embodiment of the invention, the angle at which the section 24 is chamfered is 45° with respect to the flat section 25 and the longitudinal axis 26.

For purposes of further illustration, somewhat different embodiment of a fuel rod end cap 27 is shown sealed in position in the end of the body 13 that is longitudinally opposite to the end that is sealed by means of the cap 17. With respect to the cap 27, chamfered section 30 is not as deep as the chamfered section 24 on the cap 17. The shallow chamfered section 30 provides a much larger area for a flat section 31 that is transversely disposed relative to the longitudinal axis 26.

Reverting to FIG. 1, the fuel assembly 10 also includes a number of control rod guide tubes, of which only two guide tubes 32, 33 are shown. These control rod guide tubes also are parallel with the longitudinal axis 11 and, as illustrated in FIG. 1 extend through the entire fuel assembly and have portions that protrude in a longitudinal direction beyond the ends of the fuel rods 12. These protruding portions of the control rod guide tubes 32, 33, are engaged in an end fitting structure 34. Typically, the end fitting structure 34 comprises a transversely disposed cellular grid end fitting 35.

As shown in the drawing, the grid end fitting 35 is spaced above the ends of the fuel rods 12. The fitting 35, moreover, is assembled from an array of mutually perpendicular plates 36, 37. The plates 36 have an array of equally spaced slots, the widths of the slots being sufficiently wide to mesh with oppositely oriented slots of widths that are suitable to accommodate the perpendicularly oriented plates 37. In accordance with one of the more significant features of the invention, the rectangular cells 38 that are formed by means of the lattice of meshing plates 36, 37 that comprise the grid end fitting 35 are in longitudinal alignment with the fuel rod end caps 17 as indicated by means of phantom lines 40.

A transversely positioned retaining grid 41, which also forms a part of the end fitting structure 34, is spaced longitudinally from the grid end fitting 35 on the side of the fitting 35 that is opposite to the fuel rods 12.

A more detailed view of the retaining grid 41 is illustrated in plan view in FIG. 3. Typically, an essentially skeletal framework of flat plate members 42 that abut mutually perpendicular members 43 engage and support the terminal sections of the portions of the control rod guide tubes 32, 33 that protrude above the fuel rod end caps 17 (FIG. 1). Note carefully in FIG. 3 that the plate members 42, 43 which comprise the framework for the retaining grid 41, as well as the intersecting plates 36, 37 that comprise the grid end fitting 35 in the end fitting structure 34 do not block or otherwise obscure the fuel rod end caps 17, of which only three illustrative end caps are shown in FIG. 3. This aspect of the invention provides a means for inspecting the integrity of the individual fuel rods in a manner that will be considered subsequently in more detail.

Collars 44, 45 (FIG. 1) are secured to the control rod guide tubes 32, 33, respectively in order to bear against the adjacent transverse surface of the grid end fitting 35 in order to limit the travel of the fitting 35 toward the fuel rods 17 in the direction of the longitudinal axis 11. The control rod guide tubes, as exemplified by means of the two guide tubes 32, 33, or fitted extensions of these tubes, extend through the grid end fitting and through the retaining grid 41. The ends of the control rod guide tubes 32, 33 are, as shown in FIG. 3, secured in the respective cells formed in the skeletal framework that comprises the retaining grid 41 to prevent further movement of the fuel assembly 10 (FIG. 1) in the direction of the longitudinal axis 11 that is away from the retaining grid 41. An array of coil springs 46, 47 each encloses in general axial alignment a respective one of the control rod guide tubes 32, 33 between the grid end fitting 35 and the retaining grid 41. These springs tend to restrain movement of the fuel assembly 10 in a longitudinal direction.

Further in accordance with the invention a scanning support structure 50 is positioned above and in longitudinal alignment with the fuel assembly 10. As shown in FIG. 1 the scanning support structure 50 comprises a rectangular array of four longitudinally disposed structural members, of which only members 51, 52 are shown in FIG. 1. The members 51, 52 are transversely spaced from each other, and held in a rigid array by means of cellular grid 53, 54 and 55. The members 51, 52 are secured to a transverse brace 56 that is mounted on four hydraulic cylinders, of which only the two cylinders 57, 60 are shown in the plane of the projection for FIG. 1. When activated, the cylinders 57, 60 move the scanning support structure 50 in a longitudinal direction that is either toward or away from the fuel assembly 10, depending on the choice of the operation.

The hydraulic cylinders 57, 60, the brace 56 and the scanning support structure 50 are mounted as a unit on an indexing carriage 61 that is, perhaps, best illustrated in FIG. 4. As shown, the carriage 61 has a transversely disposed frame 62 that supports the hydraulic cylinders 57, 60 and through these cylinders, the scanning support structure 50. Four wheels, of which only wheels 63, 64 are shown in FIG. 4 are located at the extremities of the frame 62. These wheels ride in tracks 65 that are formed in a transversely positioned main brace 66. The main brace 66, in turn has wheels 67, 70 mounted on axles which are perpendicular to the axles for the wheels 63, 64. The wheels 67, 70 on the main brace 66 ride on tracks 68 that are secured to the flange of nuclear reactor pressure vessel 69.

This mutually perpendicular orientation of the sets of wheels 63, 64 and 67, 70 enables the scanning support structure 50 to be indexed precisely with respect to a particular fuel assembly 71 within reactor core 72. The specific movement of the indexing carriage 61 relative to the reactor core 72 can be manually controlled or controlled automatically through servomotors, or the like.

The brace 56 on the indexing carriage 61 also provides a track for a wheeled radiation scanning dolly 73. A gamma radiation scanner 74 for registering the integrity of the individual fuel rods within the fuel assembly 71 is fixed to the dolly 73. As best shown in FIG. 1, the scanner 74 is selectively aligned with one among a group of radiation scanner tubes 75, 76. These tubes 75, 76, open on their respective ends that are adjacent to the scanner 74 are, nevertheless, sealed on their opposite ends which, as shown in the drawing are in direct contact with fuel rod end caps 17. To insure this direct contact with the end caps 17, the scanner tubes 75, 76 are spring loaded 77, 80. This spring loading presses the tubes 75, 76 downwardly against the caps 17 by bearing against stops 81, 82 and the brace 56.

To more precisely position the radiation scanner 74 with respect to the radiation scanner tubes 75, 76, the scanner 74 is mounted on a further set of wheels 83 that are oriented at right angles with the wheels on the dolly 73.

In accordance with a feature of the invention, the scanner tubes 75, 76 exclude shielding materials from the path between the radiation scanner 74 and the caps 17 on the fuel rod that is under inspection. Typically, this excluded shielding material would comprise water 84 (FIG. 4) in the pressure vessel 69. In these circumstances, the scanner tubes 75, 76 (FIG. 1) would provide a clear and unobstructed line of sight, or radiation path between one of the fuel rods 12 and the radiation scanner 74.

In operation, as shown in FIG. 4, the scanning support structure 50 is longitudinally aligned with the predetermined fuel assembly 71. The hydraulic cylinders 57, 60 are activated to move the support structure 50 in a longitudinal direction to enable the support structure 50 to contact the fuel assembly in the manner shown in detail in FIG. 1. As illustrated in FIG. 1, the scanner tubes 75, 76 under the spring loading 77, 80 slip through respective cells in the grid structures 53, 54 and 55. In accordance with the invention, moreover, the scanner tubes 75, 76 also passes through longitudinally aligned cells in the retaining grid 41 and the grid end fitting 35 to bear directly against the respective end caps on the fuel rods 12. The two illustrative scanner tubes 75, 76 are shown in FIG. 3 passing through the retaining grid 41 and the grid end fitting 35. Naturally, a pattern of many more of the scanner tubes 75, 76 beyond the two tubes illustrated in FIGS. 1 and 3 would be preferred for the practice of the invention in order to accelerate the sequential examination of the radiation that is emitted from each of the fuel rods 12. Further in this respect, more than one radiation scanner also can be mounted on the scanning dolly 73 to decrease the over-all inspection time.

Thus, the scanner 74 is moved manually, or with the help of servomotors, and the like, automatically into longitudinal alignment with one of the radiation scanner tubes 75, 76. Typically, a germanium semiconductor detector or a crystal scintillation detector is suitable for the purpose of observing the radiation that is emitted from the fuel rod that is under observation. Because the particular scanner tube that is aligned with the radiation detector excludes shielding materials from the path between the fuel rod and the detector, and the recess 20 (FIG. 2) in the fuel rod end caps 17 further reduces the volume of shielding material that is in this path, a superior radiation signal is registered from the fuel rod 12 that permits the fuel rods to be individually inspected in situ without imposing a need to withdraw an entire fuel assembly 71 (FIG. 4) from the pressure vessel 69 for detailed remote control disassembly and inspection.

To inspect another group of the fuel rods 12 (FIG. 1), the hydraulic cylinders 57, 60 are activated to draw the scanner tubes 75, 76 in a longitudinal direction away from the fuel assembly 10 in order to withdraw these tubes from the end fitting structure 34 and to permit these tubes to clear the grid end fitting 35 and the retaining grid 41. The indexing carriage 51 (FIG. 4) is repositioned to longitudinally align the scanner tubes 75, 76 (FIG. 1) with another predetermined pair of fuel rods. Upon repositioning these scanner tubes 75, 76, the hydraulic cylinders 57, 60 are once more activated to lower the scanner tubes 75, 76 down through the longitudinally aligned cells in the retaining grid 41 and the grid end fitting 35 to bear against the respective end caps 17. The radiation scanner 74 and its associated dolly 73 then is manipulated or controlled to further align longitudinally with a respective one of the scanner tubes 75, 76, and so on until the inspection of each of the fuel rods in the reactor core 72 (FIG. 4) is complete.

After the entire inspection has been carried out, the entire inspection structure from the scanning structure 50 to the tracks 68 are removed from the pressure vessel 67 to permit the reactor system to be restored to operation or made available for further work.

The embodiments of the invention in which an exclusive property or privilege is claimed are defined as follows:

1. In combination with an open ended nuclear reactor pressure vessel having a flange around the top periphery thereof, an apparatus for positioning, supporting, and longitudinally aligning a radiation scanner tube, within the pressure vessel, in direct contact with an end cap of a fuel rod in a fuel assembly having a plurality of fuel rods, comprising: a track mounted on the flange; a main brace; first wheel means, operatively connected to the ends of the main brace, for transversely moving the main brace along the track relative to a longitudinal axis in a first direction; second wheel means, engaging the main brace, operatively connectd to a frame, for transversely positioning the frame along the length of the main brace relative to the longitudinal axis in a second direction which is perpendicular to the first direction; a hydraulic cylinder, mounted on the frame, upon which a brace is mounted for movement therewith parallel to the longitudinal axis; and spring means for biasing the scanner tube from the brace, in a direction parallel to the longitudinal axis.

2. An inspection system according to claim 1 further comprising a radiation scanner and a radiation scanning dolly for movably supporting said radiation scanner to enable said radiation scanner to be aligned longitudinally with the scanner tube and with the fuel rod that is longitudinally aligned therewith.

* * * * *